Aug. 9, 1960 H. COTTE 2,948,485

DRIVING ARRANGEMENT FOR RECORD TAPE

Filed Nov. 15, 1955

INVENTOR
HENRI COTTE
By. Christy, Parmelee & Strickland
ATTYS.

United States Patent Office 2,948,485
Patented Aug. 9, 1960

2,948,485

DRIVING ARRANGEMENT FOR RECORD TAPE

Henri Cotte, Paris, France, assignor to Jacques Lory, Paris, France

Filed Nov. 15, 1955, Ser. No. 546,991
Claims priority, application France Nov. 16, 1954
6 Claims. (Cl. 242—55.12)

The invention relates to an improved driving arrangement for a tape in a magnetic recording or scanning apparatus. Known driving arrangements comprise from one to three electric motors for driving the different bobbins or rollers upon or over which the tape is wound or passed.

When three motors are used, ventilation is difficult to ensure and the arrangement risks overheating which is always detrimental when magnetic tapes of plastic material are used as it may cause deformation of such tapes. Moreover, the three motors consume much current which makes it difficult to use the apparatus in a vehicle. Finally, the weight of the motors considerably increases the total weight of the apparatus which nevertheless should be portable.

When only two motors are used, the apparatus is not reliable in operation because of the mechanical complexity of the driving means.

The present invention has for its object to remedy the defects above referred to.

According to the present invention, a driving roller or disc keyed upon the shaft of a single reversible electric motor drives by friction, and through the medium of a revoluble transmission disc capable of a movement of translation between two extreme parallel positions, on the one hand a disc or capstan member in the form of a fly-wheel keyed to the shaft on which is mounted integral with said fly-wheel a guiding roller for the magnetic tape and, on the other hand and according to the direction of rotation of the motor one or the other of two supporting discs frictionally mounted on the shafts of two bobbins which in turn may become the winding-on or the winding-off bobbin.

Means are known for driving a film reel which include swinging or rocking means for transmitting frictionally or through gearing the drive from an electric motor to a winding reel or to a fly-wheel. But such means are more intricate and less reliable in operation than the means according to the invention, the movement of which is a translation.

The accompanying drawing illustrates diagrammatically and by way of example, one particular mode of carrying out the invention, and in this drawing.

Figures 1, 2, 3:
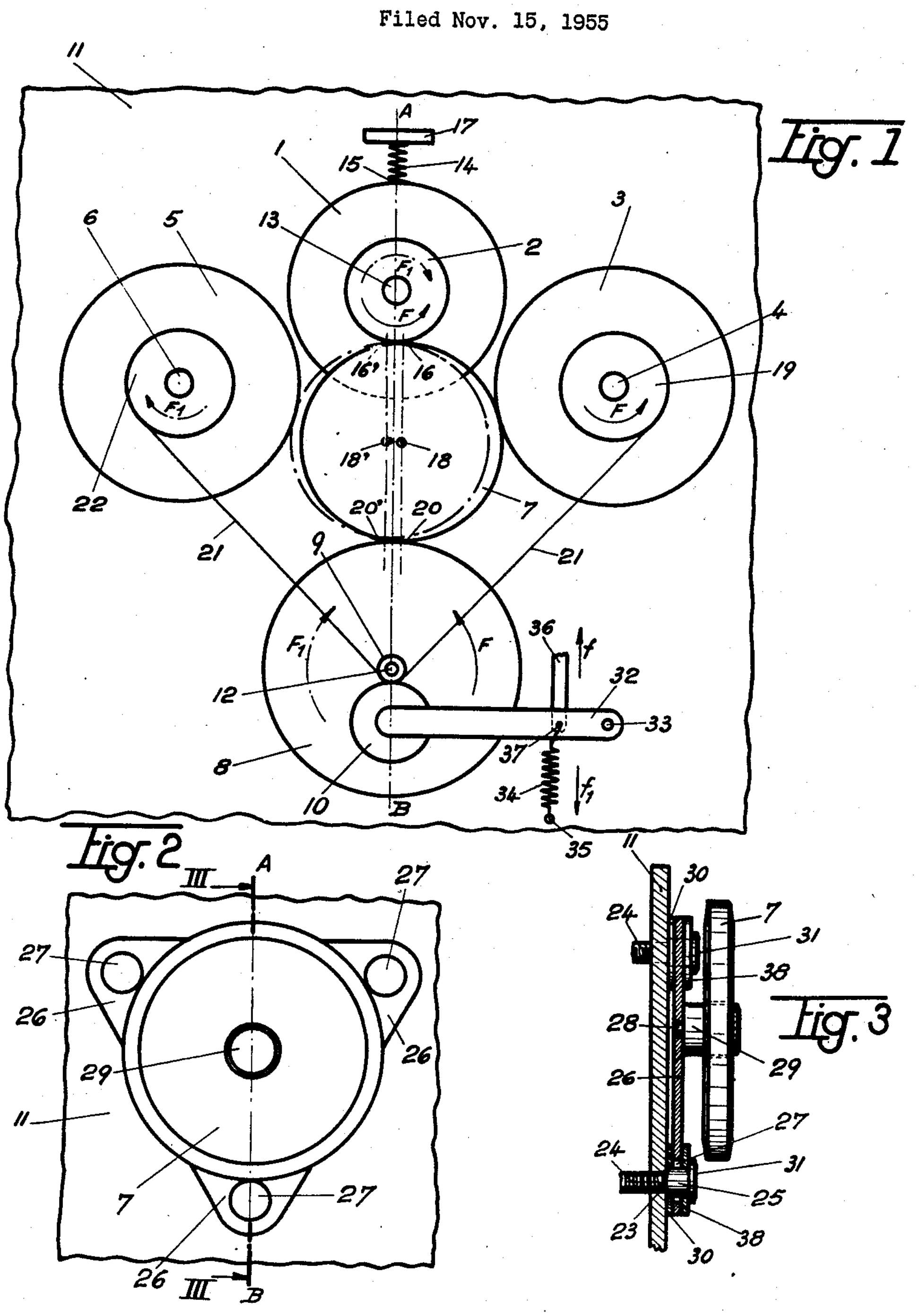
Figure 1 is a plan of the improved driving and transmission arrangement.
Figure 2 is a plan view, to a larger scale, of a transmission disc seen in Figure 1 and the means for mounting the same.
Figure 3 is a vertical section on the line III—III in Figure 2 as seen when looking in the direction of the horizontal arrows.

Referring to Figure 1, the driving and transmission arrangement is mounted on a horizontal main base plate 11. The latter supports a reversible electric motor 1 with a vertical driving shaft 13 connected to and driven by said motor and two axles 4 and 6 upon which are freely and respectively mounted bobbins 19 and 22 which alternately become the winding-on and winding-off bobbin for a magnetic tape 21. The plate 11 also supports an axle 12 upon which is freely mounted a disc or fly-wheel 8. Finally, a transmission disc 7 is mounted upon the plate 11 in a manner to be hereinafter described in detail with reference to Figures 2 and 3.

The motor 1 is put into rotation in the desired direction by a reversing switch of known kind and which is not shown as it constitutes no part of the present invention.

Upon the shaft 13 of the motor 1 is keyed a driving disc 2. The vertical peripheral edge of the disc 2 is in permanent contact with the peripheral edge of the transmission disc 7, the driving contact thereof being operatively obtained only at such point as 16 or 16', as will be hereinafter explained. Said peripheral edges may be covered with a frictional layer of, for example, rubber or synthetic plastic material.

The driving disc 2 is pressed into contact with the transmission disc 7 by any appropriate means, for example by a spring 14 bearing on the one hand against a point 15 on the motor body and on the other hand against an abutment 17 fixed on the plate 11.

The point 15 and the axis of the spring 14 are situated in the median or datum plane shown by the center or datum line A—B joining the centre of the shaft 13 with the centre of the axle 12 of the disc or flywheel 8. When the parts are at rest, the transmission disc 7 theoretically has its centre on the line A—B but such theoretical position is very unstable, so that such transmission disc tends to be displaced bodily, as will hereafter appear, with a movement of translation in its own plane in such manner that its centre is displaced perpendicularly to the line A—B between two parallel end or working positions 18, 18' seen in Figure 1.

When the driving disc 2 turns in the direction of the corresponding arrow F, that is to say counter-clockwise, the spring 14 brings, as will be explained, the point of contact between the disc 2 and the disc 7 into the extreme rightward position 16, as viewed in Figure 1, so that the transmission disc 7 is engaged with the bobbin supporting disc 3 of the axle 4 carrying that bobbin (namely the bobbin 19, as shown) which, in this direction of rotation of the motor, is to be the winding-on bobbin and on which is wound the magnetic tape 21. Therefore, the bobbin 19 also turns counter-clockwise, i.e. in the direction of the corresponding arrow F.

At the same time, however, owing to the previously mentioned parallel or translational displacement of the transmission disc 7 into its right-hand working position, said permanent driving contact with the fly-wheel or disc 8 is then at 20 on the line 16—18 parallel to the center line A—B and causes said fly-wheel or disc 8 to turn counter-clockwise, i.e. in the direction of the corresponding arrow F. Consequently, the guiding roller 9, around which is passed the magnetic tape 21 and which is solid with the disc or flywheel 8, turns in the same direction.

If, on the contrary, the motor is driven in the opposite direction, so that the driving shaft 13 turns clockwise, i.e. in the direction of the corresponding chain line arrow $F_1$, the spring 14 by exercising pressure on the motor 1 applies the driving disc 2 against the transmission disc 7 causing the latter to bodily move to the left, as viewed in Figure 1 into the position indicated by the chain line circle. In this position, the point of driving contact between the discs 2 and 7 is displaced to 16' to the left-hand side of the line A—B, the disc 7 being then in driving contact with the periphery of the bobbin supporting disc 5 supporting the bobbin 22 on the axle 6. Consequently, the bobbin 22 will now be driven in the direction of the corresponding arrow $F_1$ so that it becomes the winding-on bobbin for the magnetic tape 21 and the bobbin 19, which formerly was the winding-on bobbin, now becomes the winding-off bobbin.

At the same time, the transmission disc 7 drives the disc or fly-wheel 8 by frictional contact at 20', so that the disc or fly-wheel 8 and the guiding roller or hub 9 integral therewith now turn in the direction of the corresponding arrow $F_1$ to suit the reversed direction of travel of the magnetic tape 21.

The mounting of the transmission disc on the plate 11 will now be described with reference to Figures 2 and 3.

The plate 11 is pierced with three screw threaded holes 23, Figure 3, these holes being disposed at the three apexes of an equilateral triangle the centre of which is situated on the median or datum plane shown by the center on datum line A—B of Figures 1 and 2. Into these holes are screwed screws 24 formed with enlarged and externally smooth necks 25 carrying still larger heads 31 at their outer ends. When the screws 24 are screwed down tight, the inner ends of the necks 25 press hard against the upper face of the plate 11. Upon the screws 24 there is mounted, in such a manner that it is limitedly slidable in the horizontal plane, a triangular plate 26 having its corners preferably rounded as shown in Figure 2. The triangular plate 26 is pierced at each of its angles, and, more precisely, concentrically with the respective apexes of an equilateral triangle, with a hole 27 of larger diameter than that of the necks 25 of the screws 24. Also, the triangular plate 26 is pierced at the center of said triangle with a hole 28 in which is mounted, for example by riveting, an axle 29 upon which the transmission disc 7 is freely mounted in known manner. The plate 26 is supported between washers 30 and 38, Figure 3, and these washers prevent vertical movement of the plate 26 whilst permitting it to slide freely in its horizontal plane. The height of the neck parts 25 of the screws 24 is, in effect, such that the washers 30 and 38 and the plate 26 can lodge between the heads 31 of the screws 24 and the plate 11 with just sufficient play for permitting the sliding of the triangular plate 26 relatively to the washers 30 and 38, the pressing of the neck parts 25 against the plate 11 preventing the screws 24 from being screwed in so tightly as to immobilize the triangular plate 26.

It will be readily understood that the triangular plate 26, being supported but not rendered immovable by the washers 30 and 38 and the neck part 25 of the screws 24, will be able to take up a median position in which the axes of the holes 27 coincide exactly with the axes of the holes 23. However, such median position is obviously very unstable, and when the outer peripheral edge of the disc 7 is subjected to the pressure of the disc 2 under the combined action of the rotation of the motor 1 and pressure of the spring 14, said disc 7 will carry with it the plate 26 until the centre of the disc 7 is in either the right-hand working position 18 or the left-hand working position 18' as viewed in Figure 1, according to the direction of rotation of the motor 1.

Finally, the regularity of the passage of the magnetic tape 21 is assured in known manner by a pressure-roller 10, Figure 1, which presses the tape against the guiding roller 9.

If it should be desired rapidly to unwind the magnetic tape, it is only necessary to disengage the pressure-roller 10 from the guiding roller 9 by means of the arrangement, known in itself and forming no part of the present invention, illustrated in Figure 1. This arrangement comprises a lever 32, solid with the pressure-roller 10, pivoted at 33 on the plate 11 and influenced on the one hand by a tension spring 34 attached at 35 to the plate 11 and, on the other hand, by a control member 36 articulated at 37 to the lever 32 and movable in the direction of the arrow $f$ under the action of known means not shown. For example, the latter may be a hand lever or an electro-magnetic arrangement comprising a relay which attracts the member 36. In practice, it is only necessary for the control arrangement to influence the lever 32 in the direction of the arrow $f$, the return of this lever for disengaging the pressure-roller 10 being effected in the direction of the arrow $f_1$ by the spring 34.

If desired or preferred, the bobbins 19 and 22 may be furnished with a braking arrangement of known type, but, as this constitutes no part of the present invention, it is neither illustrated nor described.

It is to be understood that the arrangement illustrated in the drawing is only given by way of example and is capable of modification of detail without departing from the invention as hereinafter defined by the claims. In particular, the spring 14 may be replaced by a suitable elastic suspension of the motor 1, this suspension being adapted for constantly influencing the motor towards the transmission disc 7. Also, the screws 24 may be replaced by any other equivalent parts.

I claim:

1. Driving arrangement for a record tape of a magnetic recording or scanning apparatus, comprising a base plate, a reversible electric motor mounted upon said base plate, a shaft driven by said motor and carrying a driving disc, a single transmission disc in permanent frictional driving contact with said driving disc, a first axle mounted upon said base plate, a fly-wheel freely mounted upon said first axle and in permanent frictional driving contact with said transmission disc, a guiding roller integral with said fly-wheel, a second axle and a third axle mounted upon said base plate, driven discs freely mounted respectively on said second and third axles, bobbins adapted for the reception of the magnetic tape and frictionally mounted on respective driven discs, and means responsive to the direction of rotation of the shaft by the reversible motor for bodily displacing said transmission disc with a movement to translation in its own plane between two extreme positions to bring it at will into driving contact with either one of the two driven discs.

2. Driving arrangement as defined in claim, wherein the base plate is provided with three holes located at the angles of an equilateral triangle, said bodily displaceable means comprising a triangular plate pierced at each corner with a circular hole, supporting bolt-like members having a fixing part for engagement in said holes in said base plate, a shank part of larger diameter than said fixing part, and a head part of still larger diameter, said shank part being freely engageable in said holes in said triangular plate, whereby said triangular plate is freely shiftable laterally with respect to said base plate, spacing and supporting washers freely engageable on said shank part for supporting said triangular plate at a certain height above said base plate, and an axle mounted upon said triangular plate and adapted for the free mounting of said transmission disc.

3. Driving arrangement as claimed in claim 2, wherein the holes in the base plate are screw-threaded and the fixing part of the bolt-like members is similarly screw-threaded, the shank part of said members being smooth and having a height such that the triangular plate can slide freely relatively to the washers, said washers being positioned respectively on both sides of said triangular plate.

4. Driving arrangement for a record tape of a magnetic recording or scanning apparatus, comprising a base plate, a reversible electric motor mounted upon said base plate, a driving shaft connected to and driven by said motor, a driving disc keyed on said driving shaft, a first axle on said base plate and a capstan member rotatably mounted on said first axle and having integral coaxial lower fly-wheel and upper guiding hub portions, a second axle and a third axle on said base plate on either side of the vertical plane containing the center line common to said driving shaft and integral capstan member, lower driven supporting discs freely mounted on said second and third axles respectively, a single transmission disc within the space between and at the level of said driving disc and said capstan fly-wheel portion and between and at the level of said supporting discs, means for permanently urging said transmission disc into frictional driving contact with said driving disc and into abutment against said capstan fly-wheel portion in said center line plane into a theoretical essentially unstable median position where said transmission disc clears both supporting discs, and between two essentially stable working positions parallel to said median position and slightly beyond the same on either side of said center line plane where frictional driving contact is obtained between said transmission disc and corresponding either one of said supporting discs when said driving disc is driven, and means for positioning said transmission disc at a predetermined position above the base plate whilst allowing thereto sufficient limited translational freedom between both said stable working positions.

5. Driving arrangement as claimed in claim 4, wherein said means for positioning said transmission disc at a predetermined position above the base plate comprises a plate member rotatably carrying said transmission disc, spacing means for axially retaining said plate member at a constant distance from said base plate, and means for retaining said plate member between two parallel end working positions.

6. Driving arrangement for a record tape of a magnetic recording or scanning apparatus, comprising a main base plate, a reversible electric motor mounted upon said main base plate, a driving shaft connected to and driven by said motor, a driving disc keyed on said driving shaft, a first axle on said main base plate and a capstan member rotatably mounted on said first axle and formed with integral coaxial lower fly-wheel and upper guiding hub portions, a second axle and a third axle both on said main base plate on either side of the vertical plane containing the center line common to said driving shaft and integral capstan member, lower driven supporting discs freely mounted on said second and third axles respectively, a single transmission disc for imparting the drive from said driving disc to either of said lower driven discs, supporting means for said transmission disc comprising an auxiliary base plate having three circular through-holes the respective centers of which define the apexes of an equilateral triangle and a fourth axle mounted at the center of said auxiliary base plate and having a neck portion, said transmission disc being coaxially mounted on said neck portion for free rotation with respect to said fourth axle, a positioning device for supporting said auxiliary base plate from said main base plate and including a fifth axle having a fixing end portion, a middle shank portion of larger diameter and an outer retaining head portion of still larger diameter, a spacing washer member and a retaining washer member, the diameter of said through-holes being slightly greater than the outer diameter of said shank portion and the axial length of the latter and the relative thicknesses of said washer members and of the outer peripheral portion of said auxiliary base plate being so dimensioned that said auxiliary base plate is spaced at a constant distance from said main base plate while being allowed sufficient limited translational freedom to be smoothly guided between said washer members to positively operatively reach either of two working postions, and means for permanently urging said transmission disc into frictional driving contact with said driving disc and into abutment against said capstan fly-wheel portion in said center line plane into a theoretical essentially unstable median position, where said transmission disc clears both supporting discs and between two essentially stable working lateral positions, parallel to said median position and slightly beyond the same on either side of said center line plane, where frictional driving contact is obtained between said transmission disc and corresponding either one of said supporting discs when the said driving disc is driven.

References Cited in the file of this patent

UNITED STATES PATENTS

| | | |
|---|---|---|
| Re. 23,192 | Camras | Jan. 31, 1950 |
| 2,262,731 | Gruber et al. | Nov. 11, 1941 |
| 2,611,284 | Albee | Sept. 23, 1952 |
| 2,645,495 | Nelson | July 14, 1953 |
| 2,675,185 | Zenner | Apr. 13, 1954 |

UNITED STATES PATENT OFFICE

CERTIFICATE OF CORRECTION

Patent No. 2,948,485 August 9, 1960

Henri Cotte

It is hereby certified that error appears in the printed specification of the above numbered patent requiring correction and that the said Letters Patent should read as corrected below.

Column 3, line 14, for "on", second occurrence, read -- or --; column 4, line 34, for "to" read -- of --; line 37, for "in claim," read -- in claim 1, --.

Signed and sealed this 3rd day of January 1961.

(SEAL)

Attest:

KARL H. AXLINE
Attesting Officer

ROBERT C. WATSON
Commissioner of Patents